United States Patent [19]

Tsuchiya et al.

[11] Patent Number: 5,280,238
[45] Date of Patent: * Jan. 18, 1994

[54] SYSTEM FOR PROCESSING POSITION SIGNALS THAT ARE REPONSIVE TO DISPLACEMENT OF AN OBJECT

[75] Inventors: Yoshitsugu Tsuchiya; Yoichi Shimoura, both of Sagamihara, Japan

[73] Assignee: Kayaba Kogyo Kabushiki Kaisha, Tokyo, Japan

[*] Notice: The portion of the term of this patent subsequent to Jun. 8, 2010 has been disclaimed.

[21] Appl. No.: 684,928
[22] PCT Filed: Oct. 20, 1988
[86] PCT No.: PCT/JP88/01066
  § 371 Date: Apr. 16, 1991
  § 102(e) Date: Apr. 16, 1991
[87] PCT Pub. No.: WO90/04754
  PCT Pub. Date: May 3, 1990

[51] Int. Cl.$^5$ ................................ G01B 7/14
[52] U.S. Cl. ..................... 324/207.24; 340/870.35; 324/207.25; 324/207.26
[58] Field of Search ............... 324/207.15, 207.16, 324/207.18, 207.19, 207.25, 232, 227, 173, 174, 166, 165; 340/870.31, 870.32, 870.33, 870.35, 870.36; 310/155, 168

[56] References Cited

U.S. PATENT DOCUMENTS 4,764,767  8/1988  Ichikawa et al. .......... 324/207.25 X
4,951,300  8/1990  Koike ........................ 324/207.25 X Primary Examiner—Gerard R. Strecker
Assistant Examiner—Warren S. Edmonds
Attorney, Agent, or Firm—Jordan and Hamburg

[57] ABSTRACT

In a system for processing signals responsive to the position of an object, a pair of position sensors are mounted to produce sinusoidal wave signals corresponding to positioning scale markings on the object. The output of the sensors are pulse-width modulated with high-frequency sinusoidal waves. The pulse-width modulation is carried out in a selected section of the sinusoidal waves that does not include regions proximate the peak values of the sinusoidal output of the sensors.

2 Claims, 8 Drawing Sheets

SYSTEM FOR PROCESSING POSITION SIGNALS THAT ARE REPONSIVE TO DISPLACEMENT OF AN OBJECT

FIELD OF THE INVENTION

The present invention relates to a system for processing position signals such as stroke sensors, linear encoders, rotary encoders, etc.

BACKGROUND OF THE INVENTION

For example, for the detection of the stroke position of a piston rod of a hydraulic cylinder, it is customary to do a computation by converting into pulses the output signals from a magnetic sensor mounted on the cylinder side with a number of magnetic scales equally spaced embedded in the piston rod.

The magnetic sensor is intended to produce sinusoidal waves having one cycle per the minimum distance (one scale span) of the magnetic scale by the stroke of the piston rod, the output sinusoidal waves being set in a pair so as to be 90° out of phase with respect to one another.

Detection of the stroke position of the piston rod is achieved by converting these outputs $e_A$, $e_B$ from the sensor by the use of a comparator into square waves $e_{A0}$, $e_{B0}$, then inputting them into a phase discrimination or directional discrimination/multiply circuit, producing forward and backward pulses based on the following formulas, and counting these pulses by means of an up-and-down counter.

Forward pulse $= e_{A0}(\uparrow) \cdot \overline{e_{B0}} +$
$\qquad e_{A0}(\downarrow) \cdot e_{B0} +$
$\qquad e_{B0}(\uparrow) \cdot e_{A0} +$
$\qquad e_{B0}(\downarrow) \cdot \overline{e_{A0}}$ Backward pulse $= e_{A0}(\uparrow) \cdot e_{B0} +$
$\qquad e_{A0}(\downarrow) \cdot \overline{e_{B0}} +$
$\qquad e_{B0}(\uparrow) \cdot \overline{e_{A0}} +$
$\qquad e_{B0}(\downarrow) \cdot e_{A0}$ Where
$e_{A0}(\uparrow)$; pulses generated upon rise of $e_{A0}$,
$e_{B0}(\uparrow)$; pulses generated upon rise of $e_{B0}$,
$e_{A0}(\uparrow)$; pulses generated upon rise of $e_{A0}$,
$e_{B0}(\uparrow)$; pulses generated upon rise of $e_{B0}$,
$\overline{e_{A0}}$; inversion signals of $e_{A0}$,
$\overline{e_{B0}}$; inversion signals of $e_{B0}$,
$\cdot$; logic product.

Thus, as for the resolution power of position detection, it is possible to detect a quarter of a cycle of the sensor output, i.e. up to the position of a quarter of a stroke of one scale span of the magnetic scale.

With such a system, however, one cycle only of the sensor output can be divided into four, and so improvement of the detection precision of stroke position requires an arrangement of the respective scale markings of the magnetic scale at short intervals. But, there is a processing limit in making fine magnetic scale marks on the surface of the piston rod, and this does not allow detection of very small strokes, accordingly.

The object of the present invention is to provide a system for processing position signals wherein a highly accurate detection of very small strokes can be made with the magnetic scale having marks at small intervals or pitches.

A further object of the present invention is to provide a system for processing position signals wherein the detection of position can be performed accurately and safely in any area of the output of the sensors.

SUMMARY OF THE INVENTION

In the present invention, there are provided a pair of sensors spaced in the direction of displacement in such a way as to produce sinusoidal signals corresponding to the positioning scale marks, means for pulse-width modulating these sensor outputs with the respective high-frequency sinusoidal waves as modulating signals, and means for converting the pulse-width modulated signals into position signals.

The output of the sinusoidal wave signals from the pair of sensors are pulse-width modulated based on high-frequency modulating signals, and each cycle of the sensor output signals is divided and interpolated in response to the frequency of the modulating signal in order to detect very small displacements.

In this instant, since the sinusoidal wave signals from the sensors are pulse-width modulated by modulating signals having the same sinusoidal waves, the duty ratio of the resulting pulse-width modulated signals will be in an approximate accord with values on straight lines interpolated in the sensor outputs, so that position signals thus detected will be linearized.

In the present invention, means are provided for dividing one cycle of the sensor output equally into a plurality of sections, means for selecting from among the divided sections a range that does not include the approximate regions of peak values of the sensor outputs, and means for converting into position signals the pulse-width modulated signals in the selected section.

Consequently, in this case, the non-use of the sensor outputs near the peak values may result in the avoidance of any influence of deviations (registration error) which may occur when the amplitudes and oscillation centers of the sensor outputs and modulating signals are registered together. This enables highly accurate and safe detection of position even in the vicinity of the peak values.

DESCRIPTION OF THE PREFERRED EMBODIMENTS

The configuration of the present invention will be described in detail with reference to the drawings.

Figure 1:
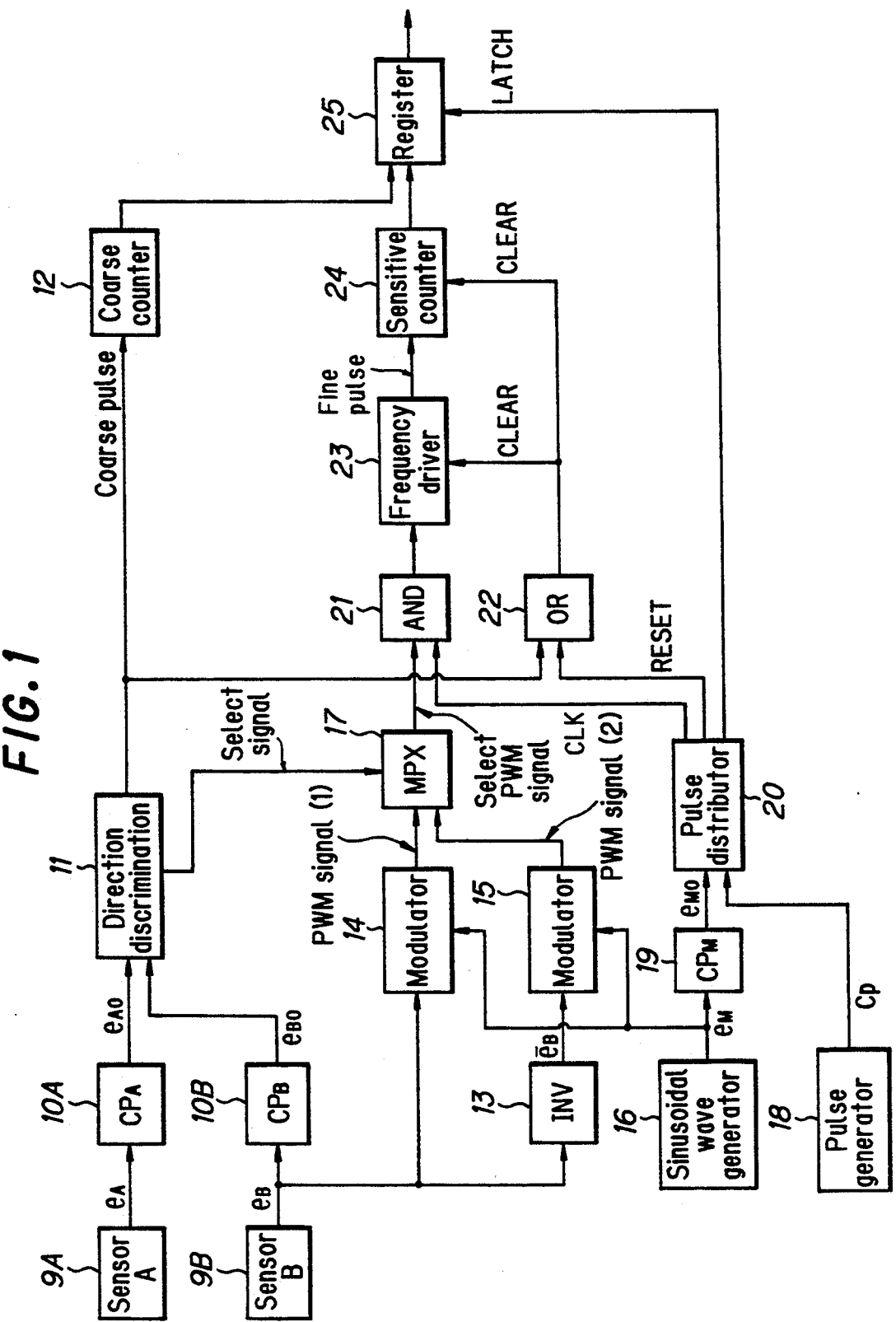
FIG. 1 is a block diagram of one configuration of the present invention.
Figure 2:
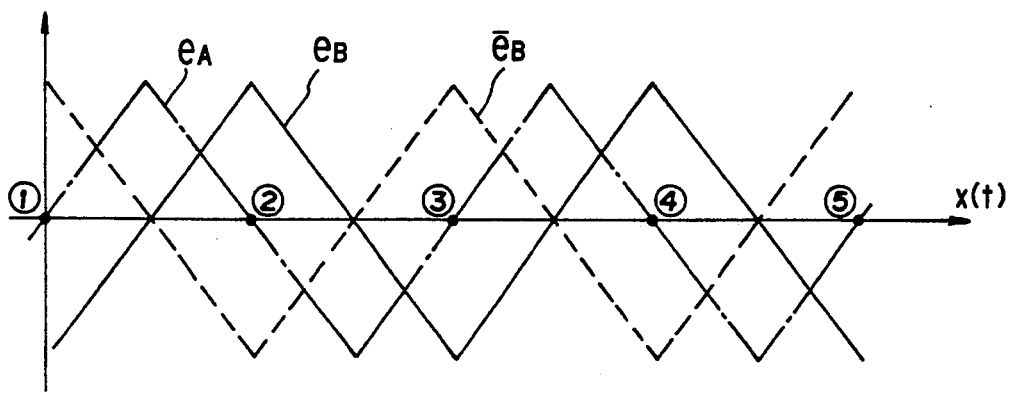
FIG. 2 is a view showing a waveform of a sensor output.

FIG. 1 is a block diagram of a first configuration of the present invention. The numerals 9A, 9B designate a pair of sensors spaced by ¼ of one scale span or pitch with respect to a magnetic scale (not shown). Sensor outputs $e_A$, $e_B$ as shown in FIG. 2 may be obtained from these sensors 9A, 9B. FIG. 2 represents a sinusoidal wave as a triangular wave for convenience sake.

With respect to detection of the coarse position, the sensor outputs $e_A$ and $e_B$ are converted by comparators 10A, 10B into square wave signals $e_{A0}$, $e_{B0}$, which are input into a directional discrimination circuit 11, whereby they can be obtained as usual pulses (called "coarse pulses" because they correspond to the coarse position corresponding to a scale span or pitch of the magnetic scale). Hence, these coarse pulses are counted by a coarse counter (intended to count coarse pulses) 12 with the result that its counts will correspond to a coarse position. A conventional counting practice covers the rise and fall of $e_{A0}$, $e_{B0}$, but only the rise and fall of $e_{A0}$ are counted in this case.

On the other hand, in connection with the fine position obtainable through interpolative calculation by dividing the interval between the coarse positions into optional numbers, one cycle of the sensor output $e_B$ (an interval between ① and ③ in FIG. 2) is divided into two half cycle portions (intervals between ①-② and ②-①) to find one half cycle by using $e_B$ and another half cycle by $\bar{e}_B$ through interpolative calculation. Specifically, a pair of PWM signals (1), (2) may be obtained by steps of production of the sensor output $e_B$ and the output $\bar{e}_B$ into which the former has been inverted by an inverter 13 in corresponding modulators (constituted by the comparators) 14, 15 and pulse-width modulating them by a high-frequency modulation signal $e_M$.

Figure 3:
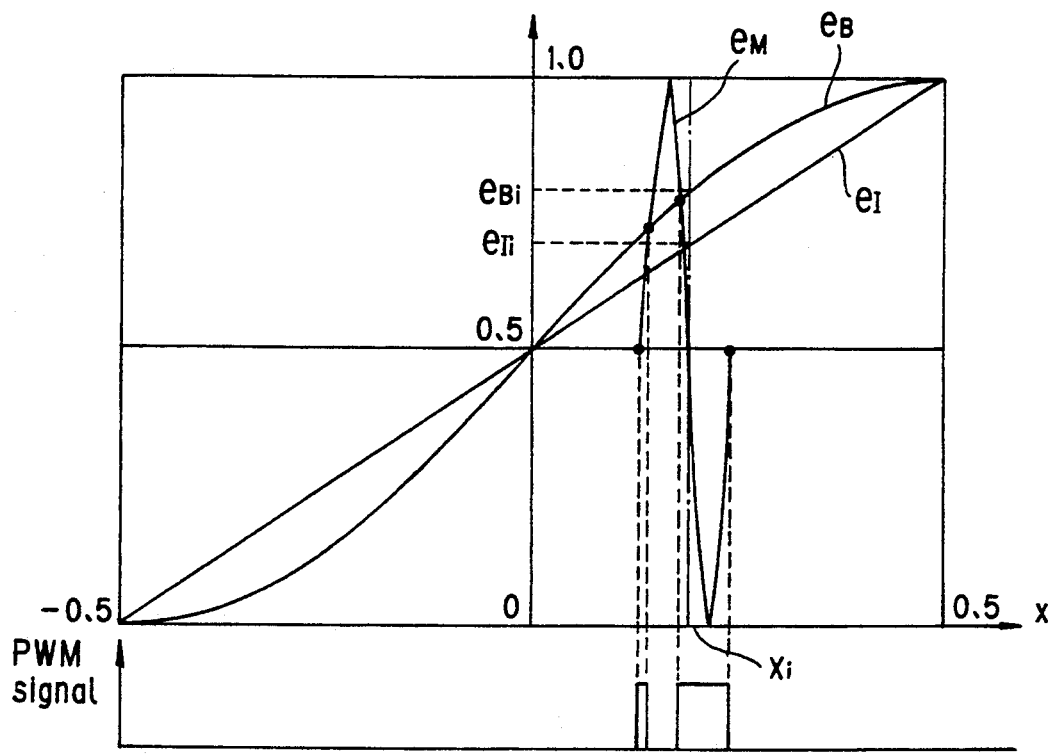
FIG. 3 is a view of s synthetic waveform of sensor outputs and pulse-width modulated signals.

In this case, the use of sinusoidal waves as modulating signals is based on the grounds that as $e_B$ and $\bar{e}_B$ are part of the sinusoidal waves (not straight lines), the use of the same sinusoidal waves allows the duty ratio (a rate of $e_M$ high level time per one cycle) to approximately match the sinusoidal wave at a value on an interpolated straight line $e_I$ as shown in FIG. 3 (the sinusoidal wave is completely registered with the value on the interpolated straight line in an ideal state where $e_M$ frequency is infinite).

The aforementioned may be logically substantiated using FIGS. 3 and 4 as follows. It is noted that FIG. 3 shows a half cycle of the sensor output $e_B$ registered with the amplitude and oscillation center of a modulating signal $e_M$ and that FIG. 4 is a partially enlarged view of FIG. 3.

Figure 4:
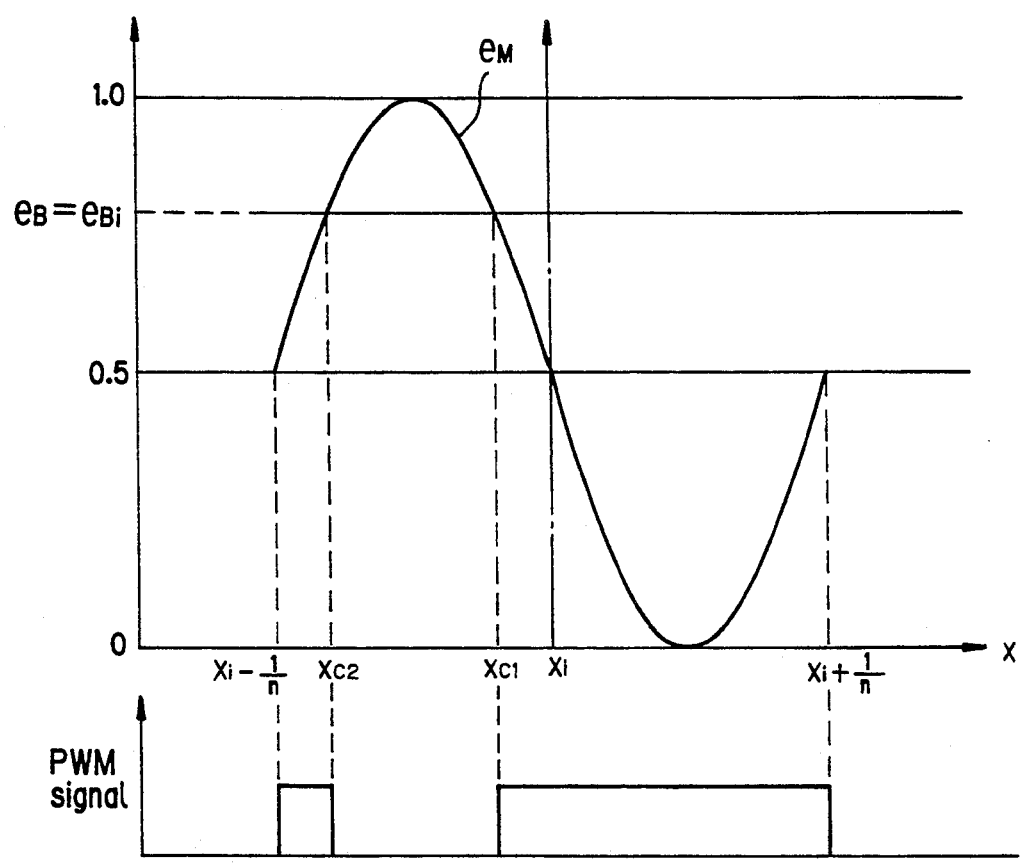
FIG. 4 is a partially enlarged view of FIG. 3.

The sensor output $e_B$ is a sinusoidal wave, where it is imaginarily shown for convenience of explanation as a triangular wave in FIG. 4, as represented by the following formula:

$$e_B = (1 + \sin(n\pi)x)/2 \tag{1'}$$

In order to find x from this formula (1), $$2e_B - 1 = \sin(n\pi)x \tag{1''}$$

thus, if x (setting x) is evaluated when $e_b = e_{Bi}$, we obtain $$xi = (1/\pi)\sin^{-1}(2e_{Bi} - 1) \tag{2}$$

On the other hand, the straight line $e_I$ interpolated into $e_B$ is a straight line which passes through point 0.5 when x=0 with an inclination equal to 1, as apparent from FIG. 3, Thus, $$e_I = x + (\tfrac{1}{2}) \tag{3}$$

Consequently, when x=xi, we obtain from the formulas (2), (3) (setting $e_{Ii}$), $$e_{Ii} = (1/n\pi)\sin^{-1}(2e_{Bi} - 1) + (\tfrac{1}{2}) \tag{4}$$

Next, the duty ratio of PWM signals is found. The modulating signal $e_M$ with x=xi being the center of the cycle is expressed as $$e_M = (\tfrac{1}{2})\{(1 - \sin((n\pi)(x - xi))\} \tag{5}$$

where n > 1

Supposing n→∞ as in an ideal case, the x coordinate of xc1 at the crossing point of $e_B$ and $e_M$ is found (see FIG. 4), setting $e_M = e_{Bi}$, $$e_{Bi} = (\tfrac{1}{2})x\{(1 - \sin((n\pi)(xc1 - xi))\} \therefore xc1 = xi - (1/n\pi)\sin^{-1}(2e_{Bi} - 1) \tag{6}$$

Also, it is easily apparent from FIG. 4 that the following holds true $$xc2 = \{xi - (1/n)\} + (1/n\pi)\sin^{-1}(2e_{Bi} - 1) \tag{7}$$

Thus, the duty ratio $\sigma i$ of PWM signals is $$\begin{aligned}\sigma i &= [(xi - xc1) + \{xc2 - (xi - (1/n))\} + \\ &\quad \{(xi + (1/n) - xi)\}]/\{(xi + (1/n) - (xi - (1/n))\} \\ &= \{(2/n\pi)\sin^{-1}(2e_{Bi} - 1) + (1/n)\}(2/n)^{-1} \\ &= (1/\pi)\sin^{-1}(2e_{Bi} - 1) + (1/2)\end{aligned} \tag{8}$$

A comparison of the formulas (4) and (8) apparently shows that the duty ratio $\sigma i$ of the PWM signal is equal to a value $e_{Ii}$ on the interpolated straight line. That is, the property of the duty ratio of the PWM signal to the sensor output is linearized by the pulse-width modulation.

Such a division of the scale spans or pitches of the sensor signals into an optional number may improve the accuracy of position detection through subsequent interpolative calculations.

Since one cycle of the sensor signal is divided into two half cycles and interpolations take place in the separate half cycles, said PWM signals (1), (2) are selected by a multiplexer 17. The multiplexer 17 is used to select with reference to selection signals from the directional discrimination circuit 11 PWM signal (1) when $e_{A0} = 1$, and PWM signal (2) when $\bar{e}_{A0} = 1$. Then, the duty ratio of the selected PWM signal is converted into a constant value by the use of a clock pulse CLK.

Clock pulses (CLK pulses) fed by a pulse distributor 20 after passing through an AND circuit 21 are controlled with the selected PWM signals as gate signals and the passed CLK pulses are counted by a sensitive counter 24 as counts. The counted resolution of the duty ratio is established by a frequency divider 23 installed in front of the sensitive counter 24.

In order to find stroke positions from values of the coarse counter 12 and sensitive counter 24, the values per cycle of the modulating signal of both counters are latched in a register 25. For LATCH signals, clock pulses Cp which are first emitted after the rise of square wave signals $e_{M0}$ into which the modulating signals $e_M$ have been converted by the waveform arrangement are picked up for use (see FIG. 5).

Because it is necessary to reset the frequency divider 23 prior to counting, clock pulses C following LATCH signals and coarse pulses are passed through an OR circuit 22 so as to obtain RESET signals. The inclusion of the coarse signals in the RESET signals is due to the fact that, since the sensor outputs and modulating signals are not synchronized with each other, if the coarse signals are input while modulating signals are being fed, the contents of the sensitive counter in operation will be carried over with the coarse signals, thus causing errors in interpolation.

Pulse strings following the RESET signals will become said CLK. LATCH, RESET, and CLK pulses with each being processed by the pulse divider 20 based on square wave signals $e_{M0}$ emitted with clock pulses Cp and modulating signals $e_M$ and processed by the comparator 19.

As an example, if one scale span or pitch is 2 mm, the codes of the coarse and sensitive counters 12, 24 are BCD, and each counting interval is divided into ten to provide a fine counting, the coarse counter 12 will obtain over 10 digits, and the sensitive counter will have 10 digits. In this respect, the use of the interpolation system may lead to an improvement of the scale position in accuracy up to one decimal point.

It goes without saying that the codes of the register 25 are matched with the codes of the coarse and sensitive counter 12, 24.

Figure 5:
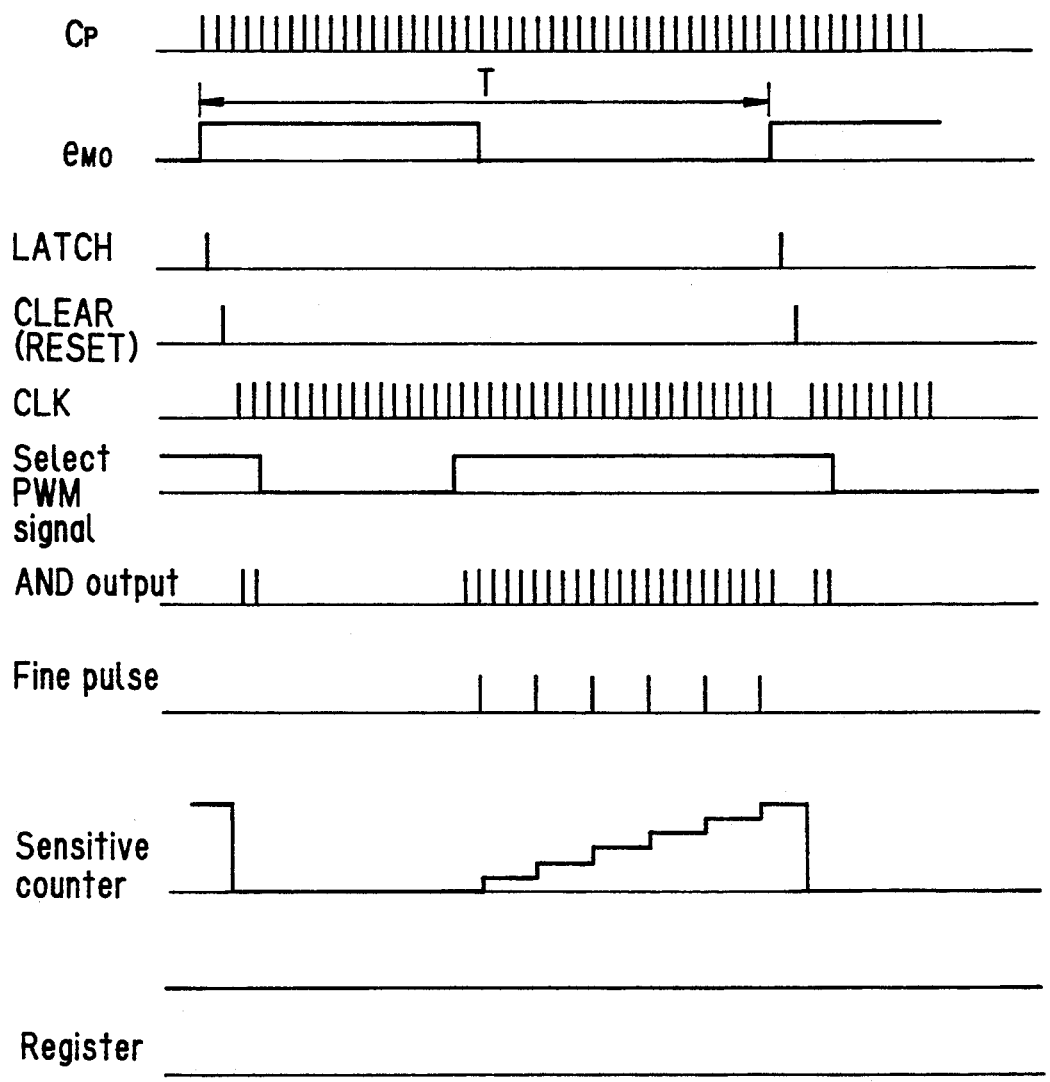
FIG. 5 is a timing chart showing operating waveform of the respective portions.

FIG. 5 is a timing chart showing the respective signals of from clock pulse Cp to register 25. In this example, 25 pulses (AND outputs) corresponding to the high level duration of the selected PWM signals are picked up from 39 clock pulses CLK which divide one cycle of the modulating signals $e_M$ into 40 (from CLEAR pulses to LOAD pulses only, whereas the true one cycle extends from LOAD to LOAD, but since CLEAR is required, the number of pulses will be decreased by one clock pulse when the pulses are picked up by the selected PWM signals, but this will not greatly affect the accuracy of the interpolation.), and the pulses are thinned out to 6 fine pulses at a rate of one pulse per 4 pulses by the frequency divider 23, and such fine pulses will be counted by the sensitive counter 24.

Figure 6A:
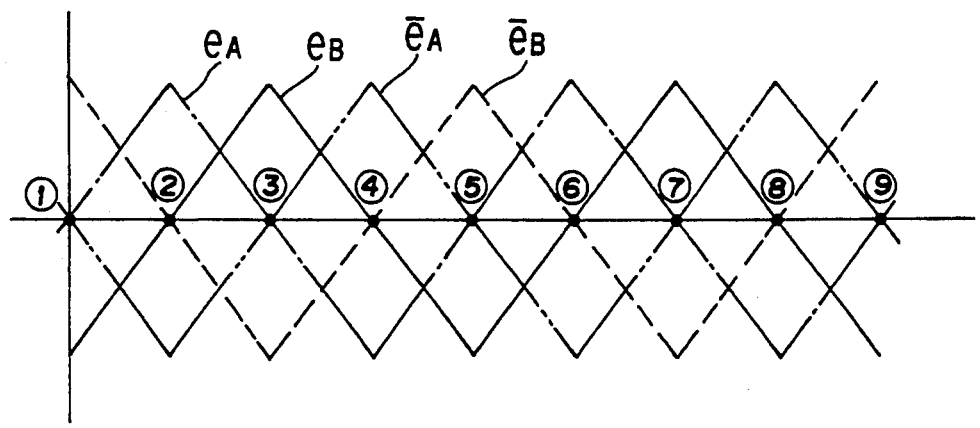
FIG. 6(A) is a view of a waveform of a sensor output of another configuration, FIGS. 6 (B) and (C) are both views of synthetic waveforms.
Figure 6B:
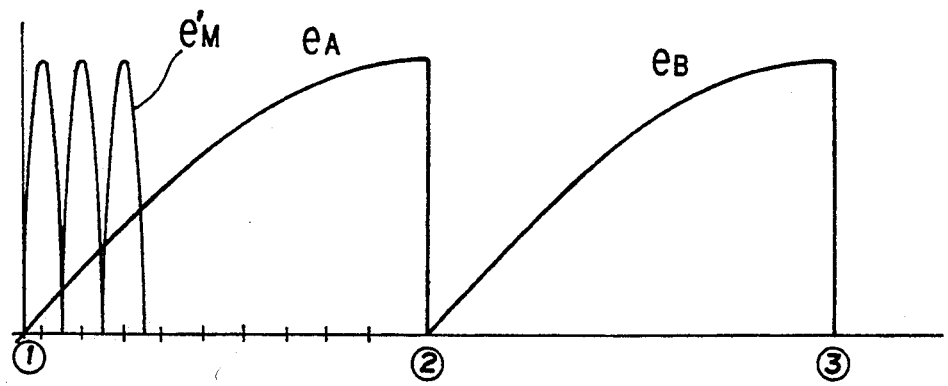
Figure 6C:
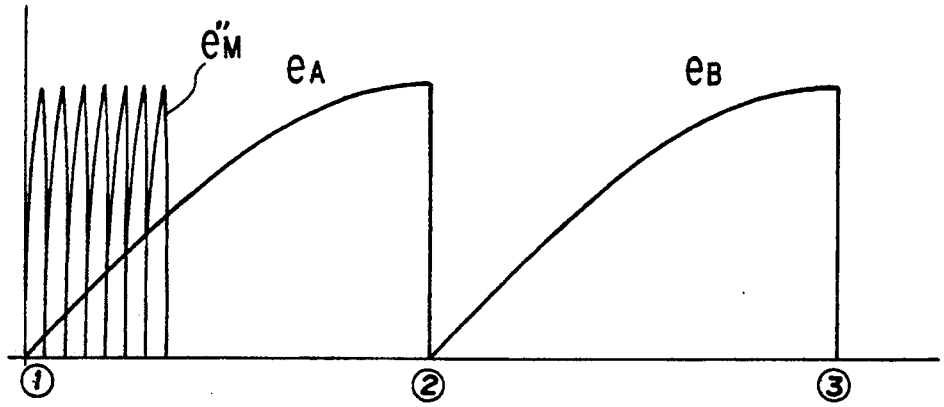

In this configuration, one cycle of the sensor output signal is divided into 2 half cycles for interpolation, but a division into 4 quarter cycles for interpolation is also possible. As illustrated in FIG. 6 (A), coarse counting is carried out at ①, ②, ③, ④, and ⑤, interpolations are performed using $e_A$ between ① and ②, $e_B$ between ② and ③, $\bar{e}_A$ between ③ and ④, and $e_B$ between ④ and ⑤, and linearization is effected by modulating signals $e_M$.

The sensor output and duty ratio of PWM signals do not correspond to one another in a precise manner in the vicinity of the area where the sensor outputs (sinusoidal waves) reach the maximum or minimum values (either called "peak value"), and this leads to a decrease in accuracy of the detection position as compared with other areas.

The reason is that a relatively slight position deviation (registration error) made between the sensor outputs and modulating signals in the amplitude and oscillation center when the registration takes place will affect the duty ratio of PWM signals to a great extent in the neighbor hood of peak values, whereby in an attempt to obtain a higher resolution near the peak value, both signals will have to be registered at amplitudes and oscillation centers with a considerably higher accuracy.

Figure 7:
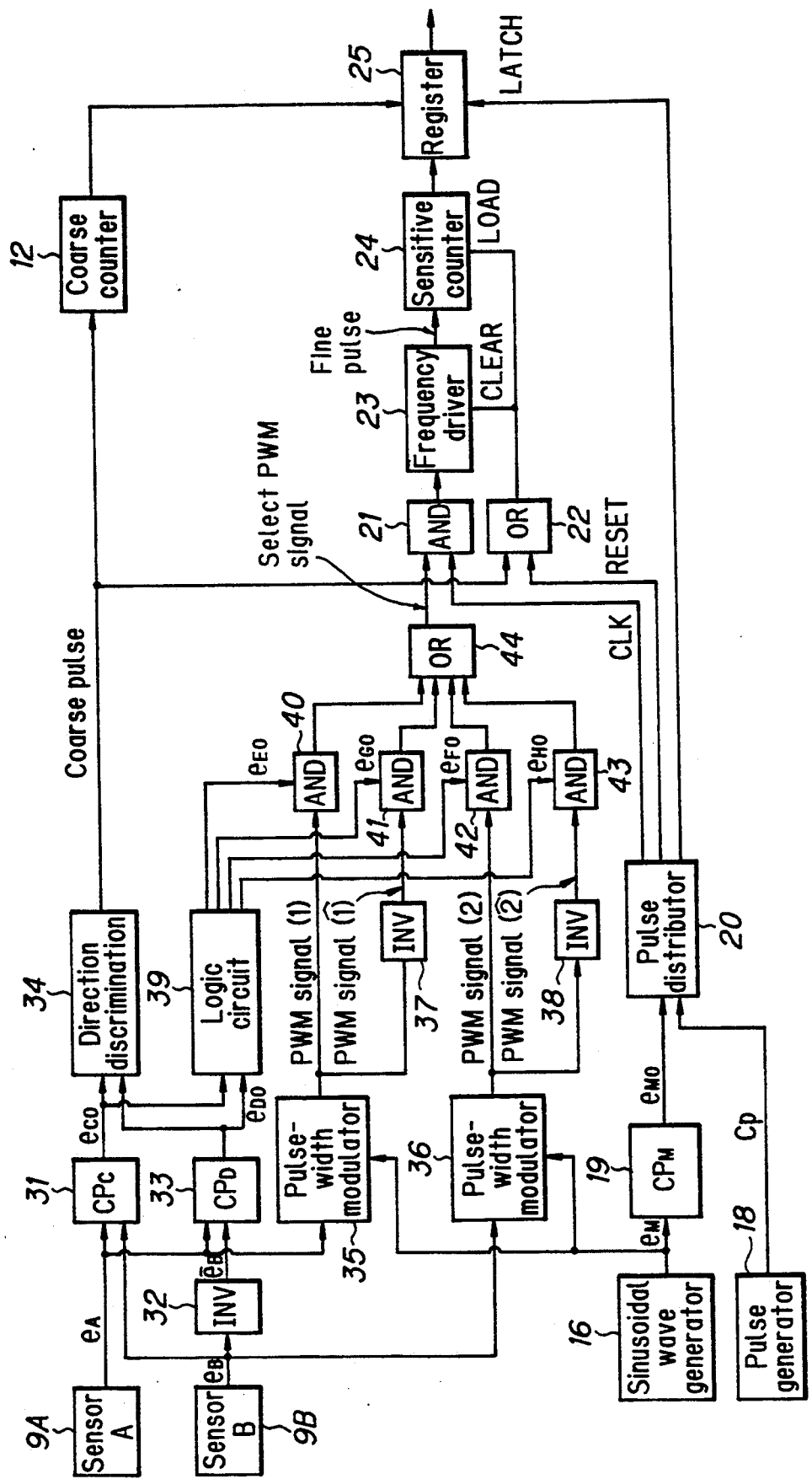
FIG. 7 is a block diagram of a third configuration.

A configuration that prevents a reduction in accuracy in the neighborhood of the peak value is shown in FIG. 7.

Figure 8:
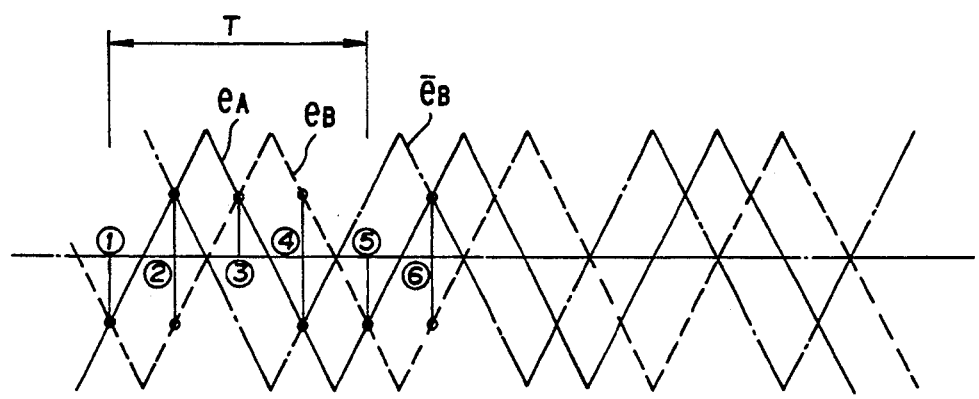
FIG. 8 is a view of a waveform of a sensor output.

In the previous configuration as described above a division of one cycle of the sensor outputs into 2 separate half cycles was used for interpolative calculation, but in this configuration the interpolative calculation near the peak value is avoided on the grounds that a great influence of the registration error will be exerted in amplitude and oscillation center in the vicinity of the peak values of the sensor outputs. Namely, as illustrated in FIG. 8, one cycle T of sensor outputs $e_A$, and $e_B$ is divided into four quarter cycle sections (①-②, ②-③, ③-④, ④-⑤), and one portion of a pair of sensor outputs $e_A$, and $e_B$ is selected from each one of these sections in such a way that it does not include the approximate regions of the peak values ($e_A$ from the sections ①-②, and ③-④, and $e_B$ from the sections ②-③, and ④-⑤).

Consequently, with this configuration, a point where $e_A$ and $e_B$, or $e_A$ and $\bar{e}_B$ intersect (①, ②, ..., ⑥,) is equal to a coarse position, and thus $e_{C0}$, $e_{D0}$, and $e_B$ are converted from a waveform pattern by the comparators 31, 33 into square waves $e_{C0}$, $e_{D0}$ which will be input into the directional discrimination circuit 34 to produce coarse pulses, and these coarse pulses will be counted by the coarse counter 12 to obtain coarse positions.

On the other hand, referring to the coarse position, $e_A$, and $e_B$ are pulse-width modulated by the corresponding modulators 35, 36 to produce PWM signals (1), (2), which are inverted by the inverters 37, 38 to obtain 4 PWM signals (1̂), (1), (2̂), (2) in total. The PWM signals (1), (2) mean inverted signals of PWM signals (1̂), (2̂).

Then, portions corresponding to the divided sections are selected from among the four PWM signals. If represented by one cycle between ①-⑤, it is apparent from FIG. 8 that PWM signals referred correspondingly to the respective sections are the section between ①-②→ PWM signal (1), the section between ②-③→ PWM signal (2), the section between ③-④→ PWM signal (1̂), and the section between ④-⑤→ PWM signal (2̂), and switching is conducted as shown in the following table using the selected signals ($e_{E0}$, $e_{F0}$, $e_{G0}$, $e_{H0}$) as illustrated in FIG. 8.

| $e_{EO}$ | $e_{FO}$ | $e_{GO}$ | $e_{HO}$ | Selected PWM signals |
|---|---|---|---|---|
| 1 | 0 | 0 | 0 | PWM signal (1) |
| 0 | 1 | 0 | 0 | PWM signal (2) |
| 0 | 0 | 1 | 0 | PWM signal (1̂) |
| 0 | 0 | 0 | 1 | PWM signal (2̂) |

Selected signals are produced in a logic circuit 39 receiving $e_{C0}$, and $e_{D0}$. FIG. 8 also shows $e_{C0}$, and $e_{D0}$.

Then a conversion of the duty ratio of PWM signals into counted values will follow; this operation is performed in the same manner as in the first configuration. That is, clock pulses (CKL pulses) passing through the AND circuit 21 are controlled by the selected PWM signals as gate signals, and the passed CLK pulses are converted into counted values by counting them with the sensitive counter 24.

To find stroke positions from the coarse and sensitive counters 12, 24, the register 25 is made to latch the values of the modulating signals of both counters per cycle.

It is due to resetting of the frequency divider 23 prior to counting that passages of clock pulses Cp and coarse pulses following LATCH signals through the OR circuit 22 allows the obtaining of resetting signals.

In contrast to that, referring to the fine counter 24, an appropriate initial value must be set prior to counting rather than clearing to zero as in the previous configuration. This is because when the duty ratio is 0.25, the value of the sensitive counter 24 must be arranged in order to be reduced to zero since, as shown in FIG. 9, the minimum value of the duty ratio of PWM signals is 0.25 and the maximum value is 0.75 (with the consequential span of the duty ratio being equal to 0.5).

Figure 9:
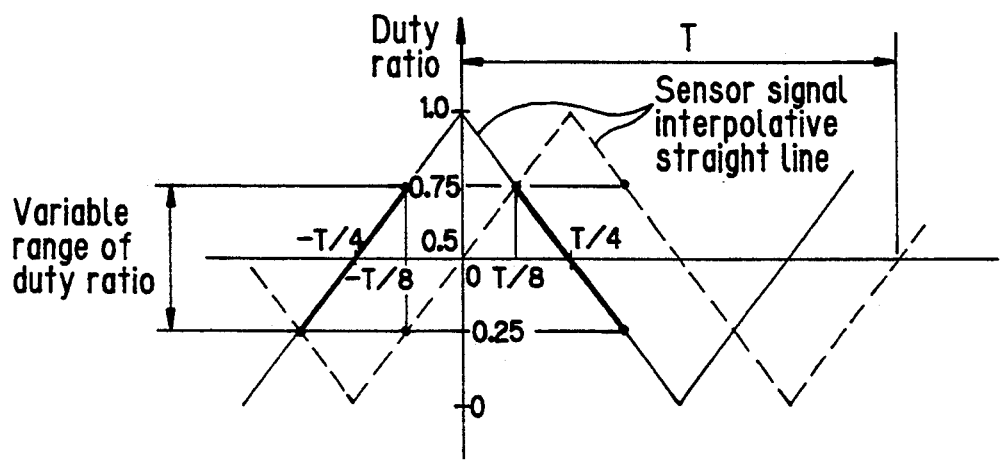
FIG. 9 is a view of a waveform for explaining the range of the duty ratio of PWM signals.

In the present configuration, as also shown in FIG. 9, use is made of only one duty ratio (precisely the range between 0.25 and 0.75) corresponding to the remainder of the cut portion approximate to the peak value of the sensor outputs. This avoids any influence of the registration error on the amplitude and oscillation center of the sensor outputs $e_A$, $e_B$ and the modulating signals $e_M$, whereby there will be no obstacle if the number of divisions within the interval between the coarse positions is increased, and the increase in the number of divisions enables more accurate and safe detection of stroke positions.

By way of example, if one scale span or pitch is 2 mm, its quarter section will be a coarse position, and thus, the coarse counter 12 is operative in counting per unit of 0.5 mm.

Figure 10:
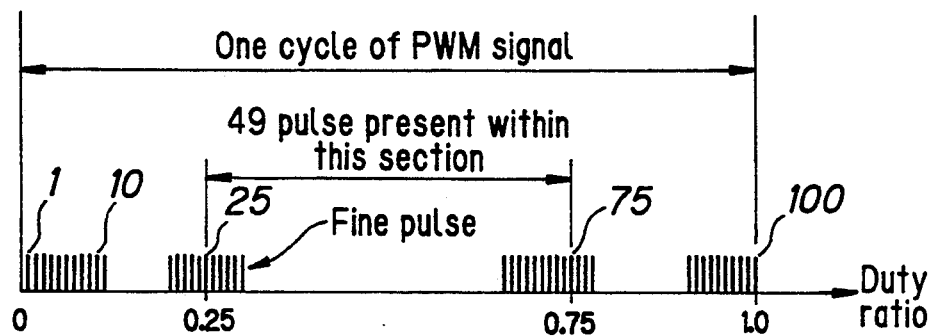
FIG. 10 is a view of a waveform for explaining the division of fine pulses.

On the other hand, the number of divisions of the interval of the coarse position is dependent on the frequency divider 23. FIG. 10 shows that if a fine pulse is divided into $50-1=49$ sections with respect to a half cycle of the PWM signal, a substantial count per unit of 0.01 is obtained at the sensitive counter 24. Namely, position detection may be achieved up to 1/200 of one scale span or pitch in this case. If the sensitive counter 24 is loaded with an initial value of "−25", it goes without saying that counting is between 0 and 49.

The present configuration shows by way of examples four divisions of one cycle of the sensor output but without limitation thereto. In short, even eight divisions are possible as the approximate regions of the peak values of the sensor outputs are not to be included in this configuration.

The present invention may be adapted to improve the resolution of not only the stroke sensors but also of linear encoders, rotary encoders, etc.

The present invention is suitable for the detection of the stroke position of members operating linearly such as piston rods of hydraulic cylinders or air cylinders, or of the angular position of rotating members.

What is claimed is:

1. A system for processing position signals responsive to displacement of an object in a given direction, comprising a pair of sensors spaced apart in said direction of displacement for producing sinusoidal wave signals corresponding to position scale markings extending in said direction, means for pulse-width modulating the outputs of the sensors using high-frequency sinusoidal waves as modulating signals, and means for generating position signals based on the duty ratio of the pulse-width modulated signals.

2. A system for processing position signals as defined in claim 1, further comprising means for equally dividing one cycle on said sensor outputs into a plurality of sections, means for selecting from among the divided sections a range that does not include regions proximate to peak values of the sensor outputs, and means for generating position signals based on the duty ratio of the pulse-width modulated signals in the selected sections.

* * * * *